United States Patent [19]

Cooper

[11] Patent Number: 4,830,690

[45] Date of Patent: May 16, 1989

[54] METHOD FOR MAKING AN ART WORK FROM COLORED ADHESIVES

[76] Inventor: Diane Cooper, P.O. Box 424, N. Hollywood, Calif. 91603

[21] Appl. No.: 859,461

[22] Filed: May 5, 1986

[51] Int. Cl.[4] .......................... B44C 3/12; G09B 11/10
[52] U.S. Cl. ..................................... 156/63; 401/183; 434/81; 434/84
[58] Field of Search .................. 434/84, 72, 79–81; 401/183; 156/63

[56] References Cited

U.S. PATENT DOCUMENTS

| 2,624,967 | 1/1953 | Phillippi | 156/63 X |
| 3,100,063 | 8/1963 | Hendersen | 434/84 X |
| 4,302,260 | 11/1981 | Meltzer | 156/63 |

FOREIGN PATENT DOCUMENTS 1117489  6/1968  United Kingdom .

*Primary Examiner*—Evan K. Lawrence
*Attorney, Agent, or Firm*—Christie, Parker & Hale

[57] ABSTRACT

An embodiment of the present invention is an art and craft product is made using colored adhesives. The method of making the product comprises using a plurality of at least partially transparent squeeze bottles, each containing a different color of a non-toxic water and soap washable and removable adhesive which dries at room temperture to a hardened stable substance of the same color. A substantially continuous film of the colored adhesive is dispensed from one or more of the squeeze bottles and applied to individual structural parts of a visible scene in an art and craft object so that the adhesive being dispensed both forms a colored portion of the scene and bonds together the structural parts forming the visible scene. Contained in and visible through the bottle in the unit is a quantity of non-toxic, water and soap washable and removable colored adhesive, that is curable to a hardened colored state at room temperature. Included in the unit is a tube for dispensing the colored adhesive from the bottle.

4 Claims, 2 Drawing Sheets

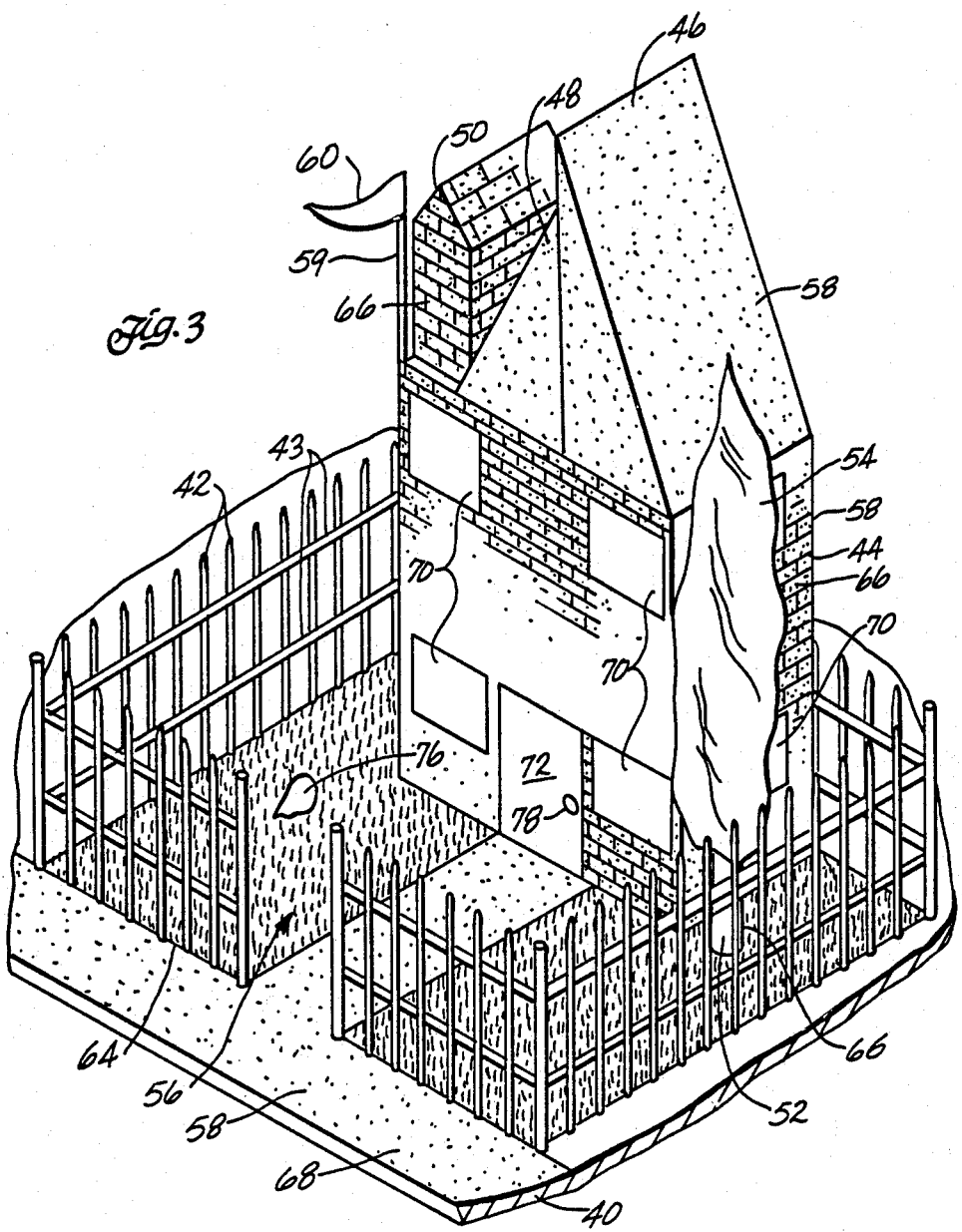

METHOD FOR MAKING AN ART WORK FROM COLORED ADHESIVES

FIELD OF THE INVENTION

This invention relates to a method for making an art work from colored adhesives.

BACKGROUND OF THE INVENTION

Various materials have been used for arts and crafts for children. Typical arts and crafts include such items as paints, adhesive, wood, cloth and other material. Typically children use these materials to paint scenes on paper, wood and other materials, to adhere different materials together, such as wood, toothpicks and foods of various types. However, these conventional materials can cause the children to lose interest and thus there is a need for products and method to maintain or increase these interests.

SUMMARY OF THE INVENTION

Briefly, an embodiment used to carry out the method of the present invention includes a unit comprising a plurality of at least partially transparent and resilient squeeze bottles. Contained in and visible through each bottle in the unit is a quantity of non-toxic water and soap washable and removable colored adhesive, that is curable to a hardened colored state at room temperature. Each bottle has a different color adhesive and a tube for dispensing the colored adhesive from the bottle.

Briefly, a method, according to one embodiment of the invention, is for creating an art and craft object from at least one material and includes the steps of dispensing through a tube from a transparent and resilient squeeze bottle, a quantity of nontoxic, water and soap washable and removable, colored adhesive; applying the dispensed adhesive to the material causing the colored adhesive to form a visible scene on the at least one material; and causing the colored adhesive in the scene to cure to a hardened state at room temperature.

In a second embodiment, the adhesive being dispensed is applied to various materials in an art and craft object to both color and adhere the materials together. The present invention offers endless possibilities for simulating new fun activities for the child. It is found that the creativity and inventiveness of the child blossoms when the present invention is used. Eye-hand coordination, sensory motor skills and color recognition, all precursors to reading, are readily experienced by the young child through the use of the present invention. The child may use scraps of anything, including wood, paper, styrofoam, plastic, cardboard and turn those objects into beautiful works of art. The invention encourages the child to experiment with colors and designs in a way never thought possible before. Even so the material involved is economical and does not require fancy expensive accessories. Since the colored adhesive, when in a liquid or viscous state, is water and soap washable and removable, it is easily cleaned from clothes, furniture and hands. Since the colored adhesive is non-toxic, children will not be injured by placing the adhesive in their mouth during use. When the adhesive hardens it forms a stable non-smearing substance on the surface, thereby, serving both as a paint and as an adhesive for gluing parts together in a scene.

By the use of a squeeze bottle with a tube it is possible to dispense a fine stream or measured amount of the colored adhesive to the desired parts. By providing the colored adhesive in transparent or semi-transparent squeeze bottles, the adhesive is attractive to the users and the right color can easily be selected.

BRIEF DESCRIPTION OF THE DRAWINGS

FIG. 3 depicts another art and craft object made using a method according to the present invention.

DETAILED DESCRIPTION

Figure 1:
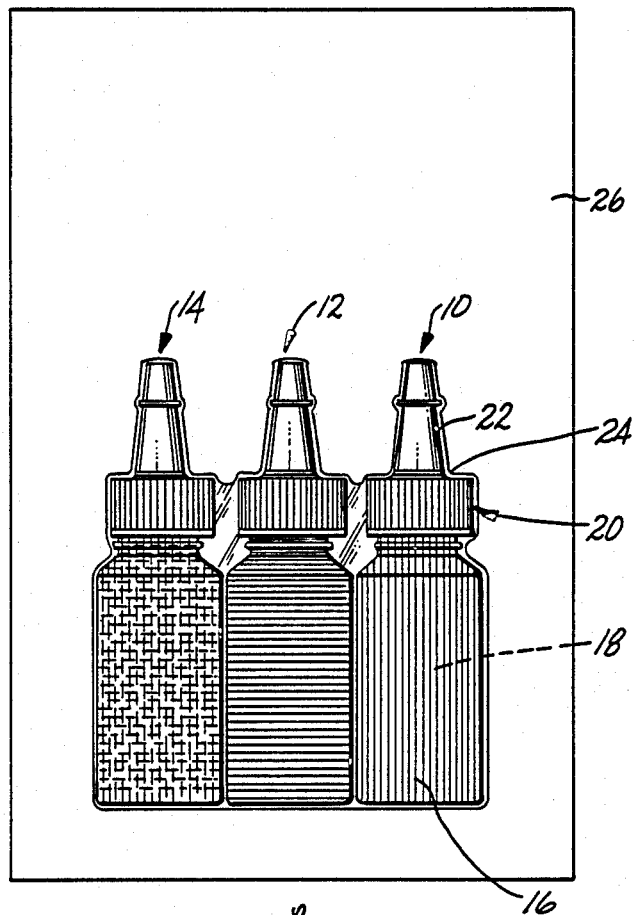
FIG. 1 is a front elevation view of a shrink wrap package showing three bottles of colored adhesive used in carrying out the present invention.

FIG. 1 depicts an art and craft product used to carry out the method of the present invention. Three units, 10, 12 and 14 are depicted, each unit includes a resilient squeeze bottle which is formed of a partially, preferably highly, transparent material. Contained in and visible through the side of each of the bottles is a quantity of non-toxic, water and soap washable and removable colored adhesive 18. Each container has a top 20 with a tapered tube dispenser 22 which allows the colored adhesive in the bottle to be dispensed in a fine thin line.

Preferably the product has a plurality of the units 10, 12 and 14 in a plastic shrink wrapped package of the conventional type well known in the art. The plastic is generally indicated at 24 and attaches the three units 10, 12 and 14 to the a front surface of a rectangular piece of cardboard 26.

Each of the bottles contains a different color of adhesive visible through the bottle, by way of example, unit 10 contains red adhesive, unit 12 contains blue adhesive and unit 14 contains yellow adhesive.

The adhesive is a substance which has a liquid or viscous state in which the substance sticks to materials and sticks materials together, dries in air at room temperature and, when dried, assumes a hard non-smear surface characteristic, adheres two surfaces or objects together by surface attachment and is colored. Preferably, in the dried state, the adhesive is substantially the same color as in the liquid or viscous state.

The non-toxic characteristic of the adhesive is important, since it will not harm children who may intentionally or inadvertently place the adhesive in their mouth.

The primary colors red, blue and yellow are included, since the secondary colors can be made from these colors. Also, the secondary colors may be included. Significantly, the red, blue and yellow colors are bright acrylic colors which are attractive to children, when contained in the bottle, after dispensing and after drying to the hardened state.

Preferably the adhesive is, when in a liquid state, a non-toxic and water washable and removable adhesive, such as a polyvinyl acetate based slow drying adhesive. Preferably the dye or colorant in the adhesive is a non-toxic water washable and removable, acrylic dye or pigment such as Ceram Coat Acrylic Craft coloring manufactured by Delta Technical Coatings containing a pigmented acrylic emulsion.

A preferred colored adhesive is a blend of a polyvinyl acetate based slow drying adhesive, an acrylic organic dye emulsion and a sorbitan trioleate food based emulsifier. A preferred ratio of the ingredients in the blend are about 12% by volume of the acrylic organic dye emulsifier and about 1½% by volume of the sorbitan trioleate emulsifier.

The blend is selected, preferably, so that the color will be uniform and will not separate. It is found that the preferred blend set forth above is particularly advantageous for preventing color separation. It would be obvious to those skilled in the art that other adhesives may be used, provided the blend, including the adhesive and pigment and other ingredients, have similar properties of adhering to and adhering together such materials as porous and semi-porous objects and yet is non-toxic to individuals if placed in the mouth and, when in a liquid or viscous state, is washable and removable from fabrics and other materials with soap and water.

Figure 2:
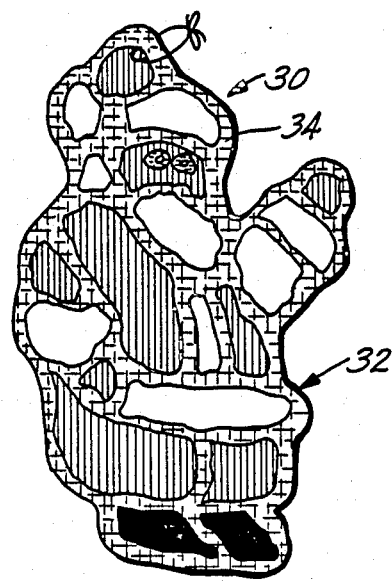
FIG. 2 depicts an art and craft object made using a method according to the present invention.

Consider the method for creating an art and craft object according to the present invention. FIG. 3 shows a Santa Claus figure 30 cut from a thin sheet of flexible translucent tissue paper 32. The design on the tissue paper 32 may be predrawn in pencil and is then completed by squeezing the squeeze bottle in unit 14 containing the yellow colored adhesive around the pencil line in the pattern indicated at 34. After the adhesive dries the previously flexible tissue paper is stiffened due to the hardened characteristic of the dried adhesive, which is still a bright yellow color. The areas between the yellow lines 34 may be left clear or colored by a felt tip pen or other coloring medium or, if desired, filled in with other colors of colored adhesive. In FIG. 2 the feet are filled in with black and the vertically lined areas are filled in with red felt tip pens. The white areas are left uncolored. Thus, a scene has been formed which is visible after drying of the adhesive.

Refer now to the art and craft object depicted in FIG. 3 formed using a process embodying the present invention. The materials used are a thin sheet of wood or wood base 40, a plurality of toothpicks 42, wood dowels 43, a rectangular block of wood 44, two triangular shaped blocks of wood 46 and 48, a generally rectangular block of wood 50 which is triangular shaped at the upper edge, an elongated stick 52, cotton batting 54, dried plant clippings 56, granulated or sand particles 58, an elongated stick 59 and a triangular piece of cloth 60. Using a method according to the invention, the aforementioned materials are coated with adhesive from the bottles. More specifically, adhesive is dispensed through the small opening in the tube from the transparent and resilient squeeze bottles and applied to the various materials to both color and adhere the materials together. The red colored adhesive is applied to and smeared over the entire outer surface of the wood block 44. A mixture of blue and yellow adhesives, to form a green color, is applied over the top surface of the wood 40. The block 44 is then set endwise on the board 40 thereby, gluing the surfaces together. The yellow colored adhesive is applied to the blocks 46 and 48 and the blocks are set on the upper edge of the block 44 adjacent each other, thereby, gluing the blocks 46 and 48 together and gluing them to the block 44. The red adhesive is also applied over the entire surface of the block 50 completely coloring it and it is placed on the top of block 44 gluing them together. The toothpicks 42 and the sticks 43 are completely coated or immersed in the blue colored adhesive and are then placed together in the form depicted to form a fence. A darker green mixture formed by the blue and yellow adhesives are applied to the wood 40, around the bottom of the fence, thereby, gluing the toothpick fence to the board 40 and forming the appearance of a green border.

A pattern or rectangular grid of lines 66 is formed on the blocks 44 and 50 and granulated or sand particles 58 are sprinkled on the red adhesive on blocks 44 and 50 forming the appearance of red brick. The blue and yellow adhesives are mixed together to form a green color and are applied to the cotton batting 54 in sufficient quantity to form a moldable mass of material which is then molded into the shape of a spruce tree around the outside of the stick 52. The green adhesive mixture is also applied at 66 to secure the stick 52 to the board 40. A different mixture of the blue and yellow adhesive 18 forming a lighter color is applied along the walkway 68 along the front of the picket fence, along the left side of the fence and approaching the doorway of the house and the granulated or sand particles are sprinkled to form a textured appearance.

The dark blue colored adhesive is applied at 70 in square patterns to form windows and at 78 to form a door knob. The yellow adhesive 18 is applied in a rectangular array at 72 to form a door. The red colored adhesive 18 is applied to the triangular shaped cloth material 60 and it, in turn, is then wrapped around and, thereby, attached by means of the adhesive to the stick 59 forming a flag on a pole. Similarly, a yellow adhesive is previously applied to the stick 59 coloring it and attaching it to the block 44. The green mixture of colored adhesive is applied between the fence and the house and the walkway 68 and the plant clippings 56 are sprinkled on the adhesive to form an appearance of a lawn. A rock 76 is also attached to the adhesive in the lawn area.

After the adhesive has dried, all of the parts, which are covered with adhesive, are colored presenting the desired artistic appearance. Additionally, the adhesive flowing continuously from the visible surface to the abutting surfaces of the materials, after drying, adheres the parts together. Further, when the adhesive dries, the surfaces of the adhesive are hard non-smearing and cause the cloth material 60 and the cotton material 54 to be stiff and hold their shape.

A method has thus been disclosed for creating an art and craft object from various materials. The steps include the steps of dispensing through a tube from a transparent and resilient squeeze bottle, a quantity of non-toxic, water and soap washable and removable, colored adhesive. The dispensed colored adhesive is applied to the material, causing the colored adhesive to form a visible scene on the material. The colored adhesive is then allowed to cure to a hardened state in air at room temperature to form the finished art and craft object. Significantly, the applied adhesive is formed as a substantially continuous film between two of the materials, to thereby adhere the materials together, to a visible part of the scene formed by the adhesive. The entire surface of the material may be coated, such as the blocks, to thereby form the appearance of paint.

Application of the colored adhesive may also be done by dipping, rubbing or brushing onto a surface.

In addition, as described with reference to FIG. 3, the colored adhesive can be used, when dried and hardened, to stiffen a flexible piece of material which, itself, may form a scene.

It would be obvious to those skilled in the art that the present invention may be used for decoration of tennis shoes, picture frames, gift wrapping, Christmas ornaments, greeting cards, pins, earrings, bracelets, refrigerator magnets, toys, etc.

Preferably the bottles depicted in FIG. 1, including the tube, are approximately 4 inches long from top to bottom, the bottle is about 1⅛ of an inch in diameter and the small upper end of the tube is about 3/16 of an inch. Preferably the bottle is made from a low density polyethylene type of flexible plastic which is easy for children to squeeze and dispense viscous materials, such as adhesives or other liquids.

The foregoing description should not be read as pertaining only to the precise structures and techniques described, but rather should be read consistent with, and as support for, the following claims, which are to have their fullest fair scope.

What is claimed is:

1. A method for creating an art and craft object, comprising the steps of:

providing a plurality of separate resilient handheld squeeze bottles each containing a quantity of a non-toxic water and soap washable and removable colored adhesive, in which the adhesive contained in each squeeze bottle has a different color and comprises a viscous liquid which dries at room temperature to a hardened stable substance of the same color;

dispensing from one or more of the squeeze bottles a substantially continuous film of the colored adhesive and applying said film to individual structural parts of a visible scene in an art and craft object so that the adhesive being dispensed both forms a colored portion of the scene and bonds together the structural parts forming the visible scene; and causing the colored adhesive in the visible scene to dry to a hardened substance at room temperature so the hardened adhesive forms said colored portion of the scene while adhering said structural parts of the scene, thereby forming a completed art and craft object.

2. The method according to claim 1 in which at least one structural part is a flexible material, and including the step of applying the adhesive to the flexible material so that upon drying, the hardened adhesive stiffens the flexibility and colors the structural part.

3. The method according to claim 1 in which the adhesive comprises a blend of polyvinylacetate-based adhesive and about 12% by volume of an acrylic emulsified dye.

4. The method according to claim 3 in which the adhesive further includes about 1½% by volume of a foodbased emulsifier to assist in uniform blending of the colored adhesive.

* * * * *